(12) United States Patent
Palet Mercader et al.

(10) Patent No.: US 6,705,888 B2
(45) Date of Patent: Mar. 16, 2004

(54) ELECTRIC CONNECTION SYSTEM BETWEEN MODULES FOR PROTECTING ELECTRIC DISTRIBUTION CIRCUITS

(75) Inventors: Marti Palet Mercader, Barcelona (ES); Miguel Ortiz Gimenez, Barcelona (ES)

(73) Assignee: GE Power Controls Iberica, S.L., Terrassa (ES)

( * ) Notice: Subject to any disclaimer, the term of this patent is extended or adjusted under 35 U.S.C. 154(b) by 0 days.

(21) Appl. No.: 10/234,733

(22) Filed: Sep. 3, 2002

(65) Prior Publication Data

US 2003/0049971 A1 Mar. 13, 2003

(30) Foreign Application Priority Data

Sep. 7, 2001 (ES) .............................................. 0102024

(51) Int. Cl.7 .............................................. H01R 31/08
(52) U.S. Cl. ...................................... 439/511; 439/507
(58) Field of Search ................................ 439/507, 511; 174/70 R, 72 B, 72 C, 72 R, 99 B, 149 B

(56) References Cited

U.S. PATENT DOCUMENTS

| | | | | |
|---|---|---|---|---|
| 3,601,754 A | * | 8/1971 | Filson ........................ 439/511 |
| 4,553,799 A | * | 11/1985 | Deters ........................ 439/507 |
| 4,591,221 A | * | 5/1986 | De Brouckere et al. .... 439/511 |
| 4,907,991 A | * | 3/1990 | Kobayashi .................. 439/507 |
| 4,950,178 A | * | 8/1990 | Harvey et al. .............. 439/507 |
| 5,713,759 A | * | 2/1998 | Shinozaki ................... 439/511 |
| 6,402,548 B1 | * | 6/2002 | Ruiz et al. .................. 439/507 |

* cited by examiner

*Primary Examiner*—Dean A. Reichard
*Assistant Examiner*—Adolfo Nino
(74) *Attorney, Agent, or Firm*—Klauber & Jackson

(57) ABSTRACT

The system of electrical connection is formed by one or more units coupled to each other, each one of them comprising a conductive piece (1) and an insulating piece (2) in which is housed the aforementioned conductive piece, both pieces (1 and 2) being free-standing which permits the assembly both to each other and also their linking with other similar units without mounting position. The conductive piece (1) has individual end posts (3) extending from twisted segments (4) with opposing orientation. The insulating piece (2) has a slot configuration with its ends prepared with bucket-shaped expansions (8) with an appropriate configuration to house the posts (3), the straight segments (6) of said posts being on the exterior, the insulating pieces (2) having on their side faces protuberances (9) of slot configuration for assembly by sliding insertion of ribs (10) provided on the side of another insulating piece (2) and to permit the coupling between them to form a connector assembly.

12 Claims, 5 Drawing Sheets

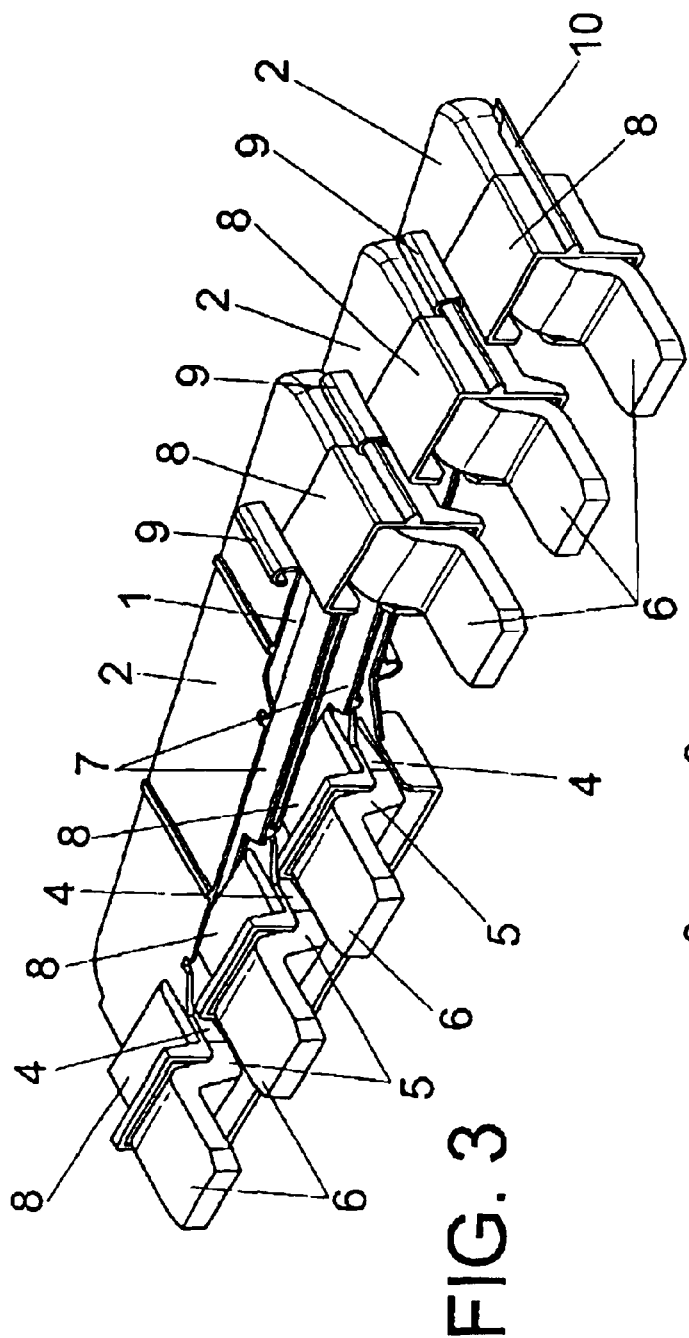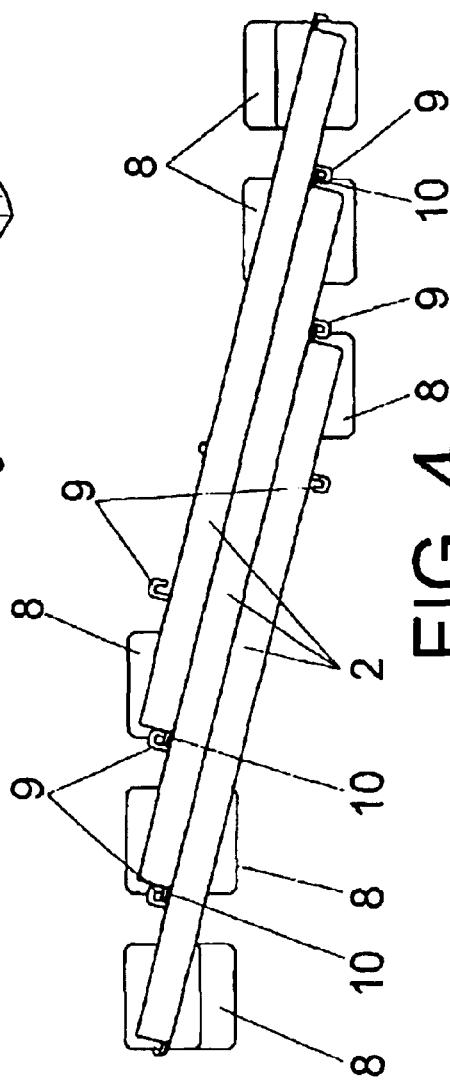

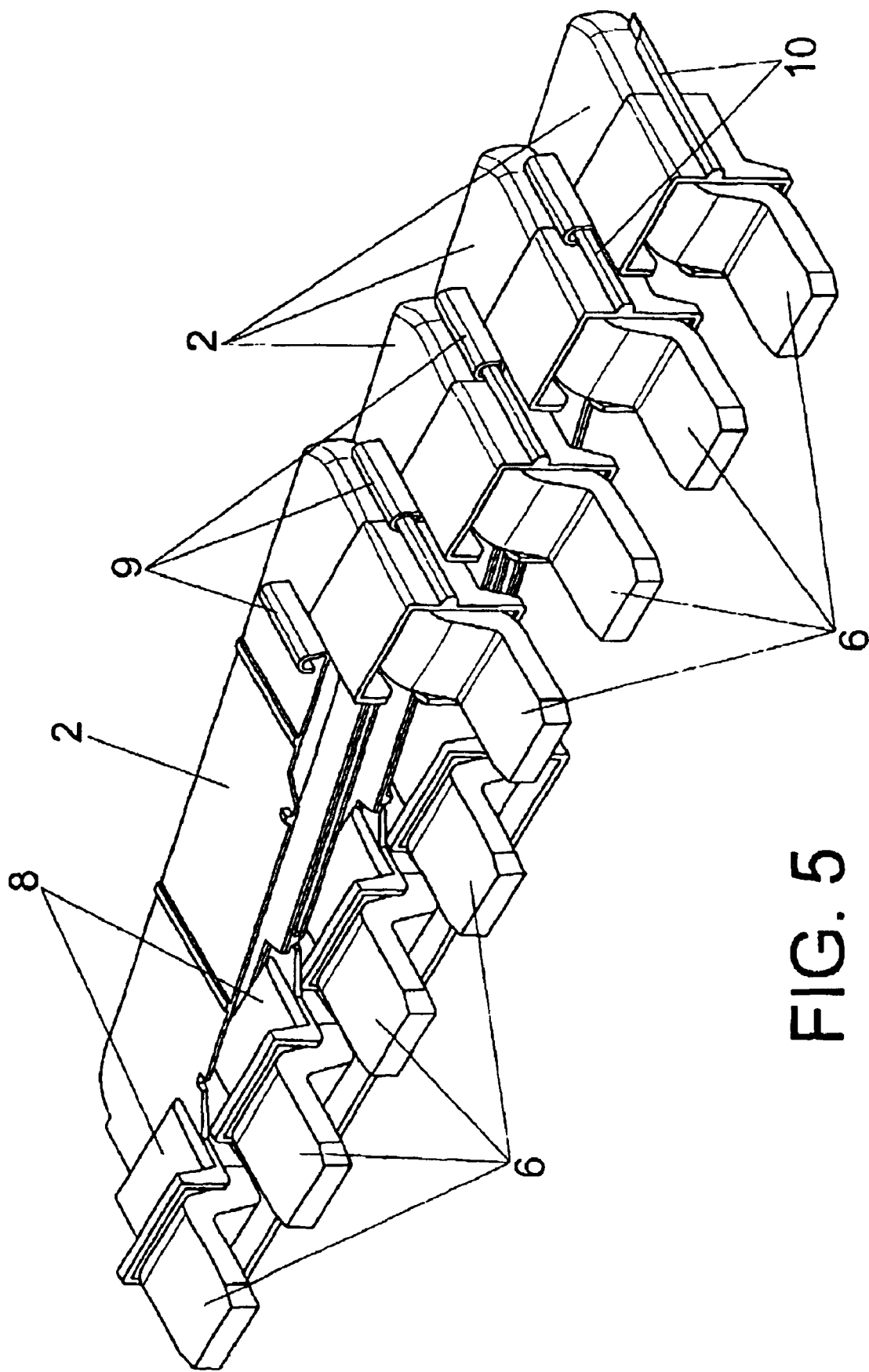

ELECTRIC CONNECTION SYSTEM BETWEEN MODULES FOR PROTECTING ELECTRIC DISTRIBUTION CIRCUITS

BACKGROUND OF THE INVENTION

The present invention relates generally to the electrical connection of devices or equipment, and particularly to devices for easily and securely establishing such connections.

The electrical union between modules or devices of electric switch-gear, such as switches, differentials, etc., is sometimes carried out by the connection to each other of conductive cables, it being necessary to perform the "classic" peeling of the cables, then effect a good union and protect the latter by means of insulating tape or any appropriate means of protection. Clearly, said system of electric union is not very practical for several basic reasons, since on one hand the manual connection operations imply a considerable loss of time, as well as being difficult to carry out due to the thickness and stiffness of the cables to be joined. On the other hand, the union should be carried out with thoroughness, independently of the need to have to effect the corresponding insulation. To all this must be added the risks for the operatives that implement the connections, since they are manipulating cables and sometimes, through negligence or by mistake, the corresponding power supply has not been cut off.

A more practical, quick and effective system is known of establishing the electrical connection between devices of the type referred to, a system that is based on independent conductive pieces or plates that connect the phases or poles to each other of the devices to be joined, which plates have their corresponding insulation to be able to manipulate them without danger. Said plates form a kit or connector assembly.

The drawback that this most usual connection system has, consists in that the plates which constitute the connection conductive pieces and therefore the insulation thereof, have to be different in their configuration in order to prevent them obstructing each other in the connection definitive assembly or position. It is clear that obtaining those different conductive metallic pieces and of as many other also different insulating pieces, for each kit or connector assembly, requires a like number of moulds and production processes, with the ensuing financial costs for the manufacturer which will undoubtedly be passed on to the selling price to the user or buyer.

Also, the fact that the connection conductive pieces are different, when carrying out the assembly or wiring itself involves having to find the correct mounting position.

SUMMARY OF THE INVENTION

The present invention relates to a system of electrical connection between modules, foreseen specifically to join electrically two or more modules which are designed with an equidistant pitch between their poles and are intended for the protection of electrical distribution circuits and/or devices.

It is an object of the invention to provide the electricity sector with a system that carries out the electrical connection between devices or modules such as breakers, switches, differentials, etc., in a simple and effective way, using a single type of conductive piece with an insulating piece, with the particularity that the identical pieces that have to implement the connection of the different poles of the devices or modules, are joined through the insulating pieces forming a single connector assembly. Preferably, both the conductive pieces and the insulating pieces are free-standing, permitting their assembly in the modules without having to find the mounting position; that is, assembly is only allowed in the correct position.

DESCRIPTION OF THE INVENTION

The system of the invention has the particularity of comprising one or several connection units, wherein each unit is formed by a conductive piece and an insulating piece, the latter being free-standing, which permits a single type of insulating piece to be obtained applicable to conductive pieces free-standing or not, provided these offer some formal characteristics that allow their adapted association to the insulating piece.

That is, in a preferred embodiment the connection unit has its insulating piece free-standing; while in another form of embodiment, as well as the free-standing insulating piece, the conductive piece is also free-standing, so that in said second case it is possible to use a single type of conductive piece and a single type of insulating piece to form a connection unit and to assemble the latter with another or others the same and form connector assemblies.

Thus, with only two different pieces (the conductive piece and the insulating piece) the connection system is resolved, a free-standing connection unit or connector assembly being obtained (formed by the assembly of several identical connection units), which does not require any special care when mounting pieces, nor when making the assembly between connection units, nor when making the wiring between the devices.

In this sense, each conductive piece is constituted preferably by a rectangular, metallic and elongated plate although it can have a configuration in which its cross-section is oval, circular, etc., the ends of which are prolonged, through one of its longitudinal edges, in individual perpendicular posts but with a slight inclination or twist wherein the twist of the two posts is in opposition. Also, such posts have a double obtuse-angled step, originating in each post a short straight end segment, both segments being parallel to each other but offset toward one and the other side of the plane of the conductive piece. Those straight end segments of the posts are those which are arranged on the connection terminals of the devices or modules to be joined electrically.

Said configuration determines that the conductive pieces are mounted free-standing.

For their part, the insulating pieces have a slotted and rectangular configuration complementary to that of the conductive pieces, to house these, so that in the ends of each insulating piece an expansion has been foreseen by way of a twisted and stepped housing for the correct positioning of the end posts of the conductive piece, with the particularity that the end and straight segments of said conductive pieces, by means of which the connection is established with the terminals of the devices or modules to be connected, are uncovered and emerge on the exterior with respect to the housings of the insulating pieces, precisely to be able to establish the connection by plugging those ends on the terminals foreseen for this purpose in the devices between which the connector assembly is applied.

Said insulating pieces have on both faces a slotted transversal projection, with a choked lateral opening, the projection of one side being located in an area opposite to that of the other side, determining guides on which slide and couple ribs foreseen for this purpose in the outer edges of the insulating pieces themselves, so that the offset in position between those guides and the ribs sliding on them, gives rise to an offset in position of the insulating pieces themselves, and therefore of the conductive pieces, all this with the object of establishing the connector assembly on the different poles of the devices to be joined electrically. The constitution or configuration of the insulating pieces also gives rise to these being free-standing. Therefore, with both the conductive pieces and the insulating pieces being free-standing, the assembly of the former on the latter will always be correct, whatever may be the position in which the assembly is carried out. Also the coupling to each other of the insulating pieces to form the connector assembly, will always be correct, whatever may be the position in which they are coupled.

Therefore, the connector assembly is also free-standing, for which reason its positioning or assembly on the devices does not require finding a mounting position, the opposite of what occurs conventionally, the assembly operation being facilitated and simpler and quicker to carry out.

In addition to all that foregoing, it is to be pointed out that the conductive pieces which are not free-standing, allow their application between devices of different size or of a different form, although said type of conductive pieces will always be adaptive to the aforementioned free-standing single insulating piece.

BRIEF DESCRIPTION OF THE DRAWINGS

To complete the description that will be provided below and with the object of assisting in a better understanding of the characteristics of the invention, the present descriptive specification is accompanied with a set of drawings on a basis on which it will be easier to understand the innovations and advantages of the system of electrical connection embodied in accordance with the invention.

FIG. 3.—It shows a view in perspective of an assembly of three connection units, foreseen for connecting two devices or modules logically equipped with three poles, so that these have to be located equidistant from each other in each case.

FIG. 4.—It shows a rear view of the connector assembly represented in the previous figure.

FIG. 5.—It shows a view in perspective of a connector assembly formed by four units.

DESCRIPTION OF AN EMBODIMENT OF THE INVENTION

Figure 1:
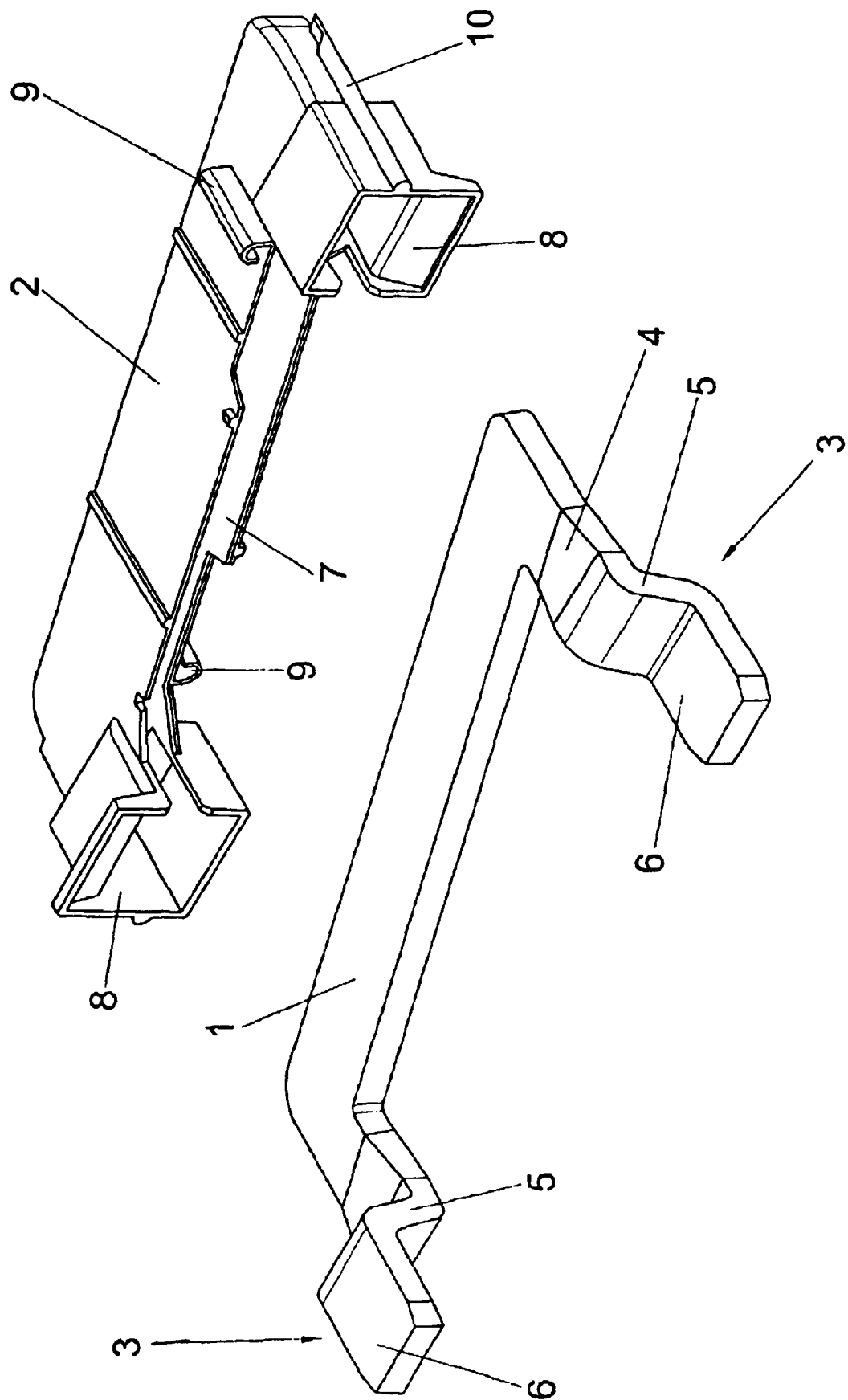
FIG. 1.—It shows an exploded view of a conductive piece and its corresponding insulating piece, the coupling of which determines a connection unit.

In the light of the figures mentioned, and in relationship specifically with FIG. 1, it can be observed how each connection unit of the several that can form a connector assembly, is constituted by means of the coupling to each other of a conductive piece 1 and an insulating piece 2, the conductive piece 1 being constituted by an elongated metallic and rectangular plate the ends of which are prolonged, through one of its longitudinal edges, in individual posts 3 with a first twisted segment 4, determining an opposing inclination for each segment 4, it being foreseen that those posts 3, and after a double bend 5, be finished off in straight end segments 6, arranged parallel to each other although offset with regard to the plane formed by the rectangular plate 1 from which the conductive piece is constituted which is being described.

As has already been mentioned in the course of the present descriptive specification, the conductive piece 1, can be constituted not only from a plate, but it can also be an elongated and metallic piece (conductor) having a cross-section which is circular, oval or another configuration, on which are established the corresponding end posts.

Said conductive piece 1 as a whole, by virtue of the twisted elongations and elbows mentioned, determines a body that is free-standing, allowing its assembly indistinctly in one way or another.

Figure 2:
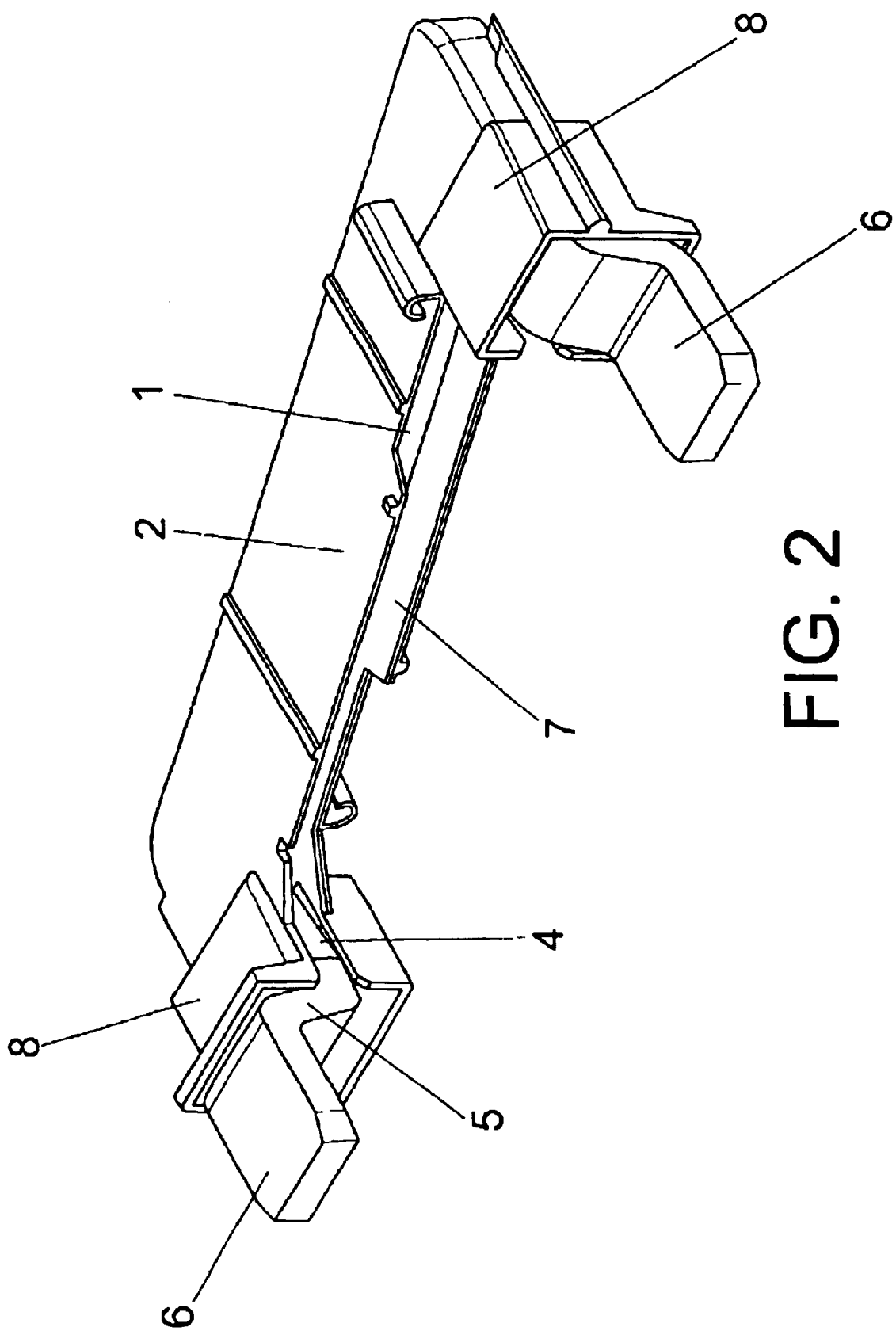
FIG. 2.—It shows the unit which is formed by the coupling of the two pieces represented in the previous figure.

For its part, the insulating piece 2 has a slotted rectangular configuration, as is clearly shown in FIG. 1, with its mouth 7 in correspondence with one of its longitudinal edges, through which it is possible to mount the conductive piece 1. Said insulating piece 2 has on its ends individual conformations in the form of housings 8 with internal elbows to be able to house the end extensions with their elbows of the conductive piece 1, forming between the two a connection unit as is represented in FIG. 2 wherein the straight end segments 6 of the conductive piece 1 appear on the exterior determining the means through which the connection is effected on the terminals of the devices to be joined, as will later be explained.

Said insulating piece 2 is also free-standing and has on each of its sides individual transversal and slotted ribs 9 with a choked side opening, determining guides in which slide respective ribs foreseen on the ends themselves of the insulating piece 2, permitting the coupling between the latter and another similar insulating piece but wherein the engagement of the end ribs 10 in the slots that determine the side and transversal projections 9, the latter being located at a certain distance from the ends, gives rise to a longitudinal displacement in the coupling between the insulating piece 2, as is shown in FIG. 3.

The insulating pieces 2 are also free-standing and therefore admit the assembly of the corresponding conductive pieces 1 without having a mounting position for the latter.

Figure 6:
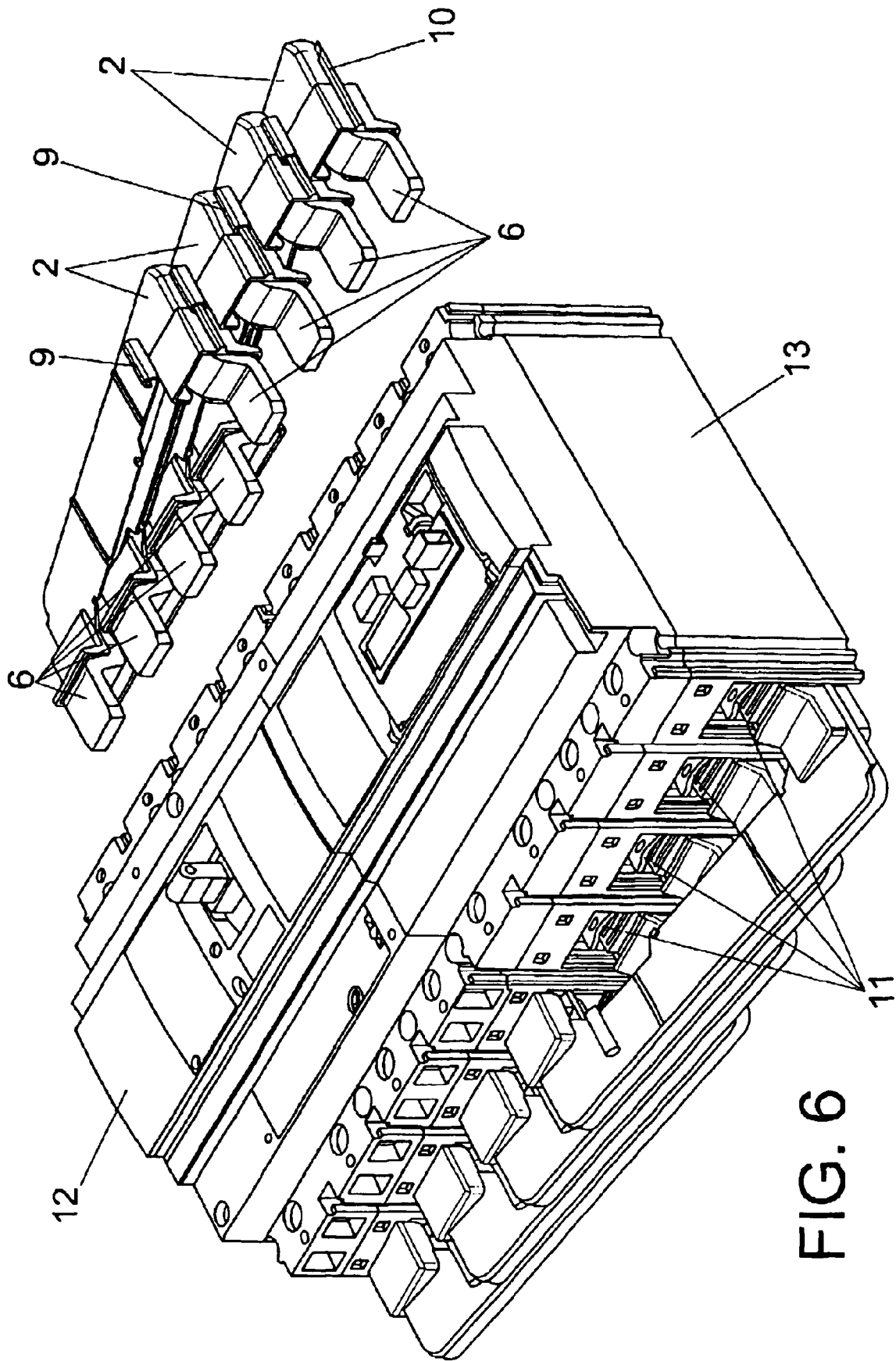
FIG. 6.—It shows a view in perspective of the connector assembly represented in the previous figure, in the position of being coupled to connect two electric modules or devices, such as a differential and a switch.

Likewise, since said insulating pieces 2 are free-standing, different units can be coupled formed by said pieces with their corresponding conductive pieces 1, without mounting position, and always with the straight end segments 6 corresponding to the connection posts arranged to be coupled to the corresponding terminals 11 of the devices or modules to be joined electrically, such as a switch 12 and a differential 13, as is shown in FIG. 6, wherein an assembly can be seen of four connection units coupled to each other, with their four pairs of straight end segments 6 corresponding to the connection posts on those terminals 11 of the devices or modules 12 and 13, which will be joined or wired electrically to each other, and wherein the poles of those devices 12 and 13 have to be located equidistant from each other.

In FIG. 5, just as in FIG. 6, the assembly is formed by four connection units, according to that referred to above, so that the assembly can have an unlimited number of units, in terms of the number of poles of the devices to be connected, each unit being formed by the corresponding conductive piece 1 and its insulating piece 2.

By means of the assembly formed by the different connection units described, one achieves on one hand a reduction in manufacturing costs, since only two different pieces must be produced, one corresponding to the conductive piece 1 and another corresponding to the insulating piece 2, the respective conductive pieces 1 and the respective insulating pieces 2, being in all cases, identical, regardless of the number that are coupled to each other, in contrast with what occurs traditionally wherein the pieces have to have a different configuration in each case to permit that in coupling they do not obstruct each other.

Also, as both the conductive pieces 1 and the insulating pieces 2 are free-standing, the assembly of the former with respect to the latter can be carried out without mounting position, a similar feature occurring in the coupling to each other of the units that such pieces 1 and 2 form, and with the mounting of the assembly of connection units on the devices to be connected or wired electrically.

What is claimed is:

1. ELECTRIC CONNECTION SYSTEM BETWEEN MODULES FOR PROTECTING ELECTRIC DISTRIBUTION CIRCUITS, intended for connecting electric modules or devices electrically, such as a switch and a differential breaker, intended for protecting electrical distribution circuits and/or equipment, comprising at least one connection unit, each unit comprising a conductive piece with respective connection posts and an insulation applied to said piece to allow to grip and manipulate thereof, wherein the insulation of the conductive piece of each connection unit, comprises an insulating piece of grooved configuration and complementary to that of the conductive piece to allow to a positioning and an adapted housing of said piece in the insulating piece, excepting its connection posts; said insulating piece being free-standing, allowing its coupling without any mounting position with at least one identical piece in order to form with respective conductive pieces a connection assembly comprising at least two connection units, for their assembly and corresponding coupling between electric devices or modules which are intended to connect to each other.

2. ELECTRIC CONNECTION SYSTEM BETWEEN MODULES FOR PROTECTING ELECTRIC DISTRIBUTION CIRCUITS, according to claim 1, wherein the conductive piece of each connection unit is free-standing, and the insulating piece is also free-standing, permitting that each connection unit can be coupled, by means of the insulating piece, to at least one identical piece and form a connection assembly comprising at least two connection units assembled to each other, whose assembly is free-standing and can be mounted without any mounting position between two electric devices or modules, establishing an electrical connection between them.

3. ELECTRIC CONNECTION SYSTEM BETWEEN MODULES FOR PROTECTING ELECTRIC DISTRIBUTION CIRCUITS, according to claim 2, wherein the insulating piece has a flat and rectangular configuration, which is grooved and complementary to that of the conductive piece, its ends being provided with corresponding extensions by way of housings with elbows for housing correctly the conductive piece with its connection posts; said insulating piece having on its faces corresponding slotted protuberances with a choked side opening, determining sliding guides for end side projections of the own insulating piece, determining a coupling with an analogous piece according to a longitudinal offset for establishing a separation between the straight end connection segments of the conductive pieces.

4. ELECTRIC CONNECTION SYSTEM BETWEEN MODULES FOR PROTECTING ELECTRIC DISTRIBUTION CIRCUITS, according to claim 3, wherein the conductive piece has different end posts in each side, permitting coupling and wiring electric devices or modules with different configurations and sizes.

5. ELECTRIC CONNECTION SYSTEM BETWEEN MODULES FOR PROTECTING ELECTRIC DISTRIBUTION CIRCUITS, according to claim 2, wherein the conductive piece has different end posts in each side, permitting coupling and wiring electric devices or modules with different configurations and sizes.

6. ELECTRIC CONNECTION SYSTEM BETWEEN MODULES FOR PROTECTING ELECTRIC DISTRIBUTION CIRCUITS, according to claim 1, wherein the connection posts of each of the conductive pieces extend from one of the edges of the latter in a twisted segment where their orientation is in opposition; the posts being prolonged in a double elbow starting from said twisted segments to be finished off in straight end connection segments, parallel to each other and offset with respect to the plane of the conductive piece, determining the means of connection on the corresponding terminals belonging to devices to be connected.

7. ELECTRIC CONNECTION SYSTEM BETWEEN MODULES FOR PROTECTING ELECTRIC DISTRIBUTION CIRCUITS, according to claim 6, wherein the insulating piece has a flat and rectangular configuration, which is grooved and complementary to that of the conductive piece, its ends being provided with corresponding extensions by way of housings with elbows for housing correctly the conductive piece with its connection posts; said insulating piece having on its faces corresponding slotted protuberances with a choked side opening, determining sliding guides for end side projections of the own insulating piece, determining a coupling with an analogous piece according to a longitudinal offset for establishing a separation between the straight end connection segments of the conductive pieces.

8. ELECTRIC CONNECTION SYSTEM BETWEEN MODULES FOR PROTECTING ELECTRIC DISTRIBUTION CIRCUITS, according to claim 7, wherein the conductive piece has different end posts in each side, permitting coupling and wiring electric devices or modules with different configurations and sizes.

9. ELECTRIC CONNECTION SYSTEM BETWEEN MODULES FOR PROTECTING ELECTRIC DISTRIBUTION CIRCUITS, according to claim 6, wherein the conductive piece has different end posts in each side, permitting coupling and wiring electric devices or modules with different configurations and sizes.

10. ELECTRIC CONNECTION SYSTEM BETWEEN MODULES FOR PROTECTING ELECTRIC DISTRIBUTION CIRCUITS, according to claim 1, wherein the insulating piece has a flat and rectangular configuration, which is grooved and complementary to that of the conductive piece, its ends being provided with corresponding extensions by way of housings with elbows for housing correctly the conductive piece with its connection posts; said insulating piece having on its faces corresponding slotted protuberances with a choked side opening, determining sliding guides for end side projections of the own insulating piece, determining a coupling with an analogous piece according to a longitudinal offset for establishing a separation between the straight end connection segments of the conductive pieces.

11. ELECTRIC CONNECTION SYSTEM BETWEEN MODULES FOR PROTECTING ELECTRIC DISTRIBUTION CIRCUITS, according to claim 10, wherein the conductive piece has different end posts in each side, permitting coupling and wiring electric devices or modules with different configurations and sizes.

12. ELECTRIC CONNECTION SYSTEM BETWEEN MODULES FOR PROTECTING ELECTRIC DISTRIBUTION CIRCUITS, according to claim 1, wherein the conductive piece has different end posts in each side, permitting coupling and wiring electric devices or modules with different configurations and sizes.

* * * * *